United States Patent [19]

Hansen

[11] Patent Number: 5,201,626

[45] Date of Patent: Apr. 13, 1993

[54] METHOD AND AN APPARATUS FOR LOADING FILLED SACKS OR SIMILAR ARTICLES INTO ENDWISE OPEN CONTAINERS OR CORRESPONDING CARGO SPACES

[76] Inventor: Egon Hansen, Åbollingvej 14, DK-6683 Fovling, Denmark

[21] Appl. No.: 689,248

[22] PCT Filed: Dec. 12, 1989

[86] PCT No.: PCT/DK89/00291

§ 371 Date: Aug. 12, 1991

§ 102(e) Date: Aug. 12, 1991

[87] PCT Pub. No.: WO90/06892

PCT Pub. Date: Jun. 28, 1990

[30] Foreign Application Priority Data

Dec. 12, 1988 [DK] Denmark .................. 6896/88

[51] Int. Cl.$^5$ ........................................... B65G 57/112
[52] U.S. Cl. ........................... 414/398; 198/418.5; 198/436; 414/794.3; 414/794.5
[58] Field of Search .......... 414/345, 347, 398, 399, 414/400, 794.3, 794.5; 198/418.5, 436

[56] References Cited

U.S. PATENT DOCUMENTS

| | | | |
|---|---|---|---|
| 3,157,301 | 11/1964 | McWilliams | 414/794.3 X |
| 3,836,021 | 9/1974 | McWilliams | 414/398 |
| 3,904,024 | 9/1975 | Smith | 414/794.5 X |
| 4,026,422 | 5/1977 | Leenaards | 198/436 X |
| 5,088,873 | 2/1992 | Ruder et al. | 414/399 X |

FOREIGN PATENT DOCUMENTS

| | | | |
|---|---|---|---|
| 2231495 | 1/1974 | Fed. Rep. of Germany | 414/398 |
| 2231496 | 1/1974 | Fed. Rep. of Germany | 414/794.3 |
| 0193834 | 11/1983 | Japan | 414/398 |
| 0031224 | 2/1984 | Japan | 414/398 |
| 0221027 | 9/1990 | Japan | 414/399 |
| 0583135 | 12/1976 | Switzerland | 414/794.3 |

Primary Examiner—Michael S. Huppert
Assistant Examiner—James Keenan
Attorney, Agent, or Firm—Antonelli, Terry, Stout & Kraus

[57] ABSTRACT

A loading apparatus adapted to be driven into a container and to receive articles such as sacks or the like one by one and to spread the sacks in horizontal cross roads by a spreading system so as to spread out the sacks in horizontal rows filling out a width of the container. The rows are consecutively transferred to a platform of a lift structure which is operable to bring single rows of sacks to be loaded upon each other up to a ceiling of the container, whereafter, the loading apparatus is retracted a distance corresponding to a length of the sacks, such that a new vertical layer of sack rows can be thereafter piled up. The container is thereby filled as effectively as possible in both the longitudinal, transverse, and height direction without any manual contribution by handling of normally heavy sacks or similar articles.

7 Claims, 2 Drawing Sheets

METHOD AND AN APPARATUS FOR LOADING FILLED SACKS OR SIMILAR ARTICLES INTO ENDWISE OPEN CONTAINERS OR CORRESPONDING CARGO SPACES

FIELD OF THE INVENTION

The present invention relates to a method of loading filled sacks or similar articles into endwise open containers or corresponding cargo spaces, wherein the loading is effected substantially horizontally from an open end portion of the cargo space, for example, to the open end of a standard container.

BACKGROUND OF THE INVENTION

Even though, over time, many different auxiliaries have been developed for automatically handling objects to be conveyed and to be piled at a receiving area, it is nevertheless still common practice that small boxes of sacks, for example, with fishmeal, are loaded purely manually in usual transport containers, at least as far as the distribution and the piling of the objects in the container are concerned.

The above referenced containers are openable at one end and, initially, the objects should be brought all the way up to the opposite end and be piled there, in, for example, five piles up against the end wall, whereafter, a further system of a corresponding number of object piles can be arranged in front of the first system, and so forth until the container has been filled.

It is known that by length adjustable conveyors it is possible to introduce the objects into the container to just the actual piling area therein, for example, initially almost forwardly of the closed end of the container, where the objects are then taken off from the conveyor and laid out on a floor of the container side by side for filling out the width of the container floor with, for example, five flat sacks, whereafter, the further supplied objects are piled on the first laid out objects so as to, for example, pile ten to fifteen sacks in each column for fully or almost fully filling out the height dimension of the container space. Thereafter, the conveyor is retracted somewhat such that a corresponding new row of object piles can be arranged in direct conjunction with the first row and, in this manner, the entire container may be gradually completely or entirely filled with transverse rows of columns of piled objects.

It is a hard work to carry out the required distribution and piling of the objects, and it is the purpose of the invention to provide a method, by which the work can be effected automatically.

SUMMARY OF THE INVENTION

According to the invention use is made of a loading apparatus, which can be introduced into the container from the open end thereof, and which is adapted to successively receive the objects from the feeding conveyor and to effect a transverse laying out of the objects and a piling of objects upon the transversely laid out objects, the apparatus thereafter being stepwise retracted from the fully introduced position for effecting a rowwise piling of the objects for filling out the container space without manual assistance and thus also without requirements as to the objects being of sufficiently small size or weight to be manually handled according to current rules for manual handling.

According to a preferred method the sacks are supplied in a single row to a transverse receiver table, on which, by transversely operating pusher means, the sacks are arranged in a transverse row, which as a whole is pushed forwardly by a forwardly movable pushing beam so as to be received on a carrier plate mounted in a lift structure, which is initially lowered to a lowermost position just above the container bottom, with the loading apparatus being introduced into the container to such a position therein that between the end wall of the container and the front end of the carrier plate there is just room for depositing the row of sacks on the container bottom. Thereafter, the carrier plate with the row of sacks is pushed forwardly from the lift structure to above this floor room, and a retainer beam is brought into position behind the rear end of the row of sacks. Thereafter, the carrier plate is retracted while the retainer beam is maintained in this position, whereby the row of sacks will be delivered to the container bottom at the desired place.

Meanwhile, a new row of sacks is arranged on the receiver table, and the lift structure is raised and returned into its receiving position. Upon receipt of the new row of sacks the lift structure will carry the receiver plate to a level just above the top level of the previously deposited sacks, such that the new row of sacks when pushed off as described above will be loaded onto the first deposited sacks. The operation may continue in this manner, with the lift structure being moved up and down as required for a successive piling of the sack layers, until a last layer is laid out near the ceiling of the container.

Thereafter, the entire loading apparatus is moved a step rearwardly in the container corresponding to the length of the sacks, and the operation can be repeated, now for producing a new row of piles in front of the first row of piles, and so forth until the container is full. By the building up of the last rows of piles the loader apparatus will of course be projecting from the container, and it is important, therefore, that the loader outside the container be supported in the same level as the container bottom. In principle this can be achieved by supporting the loader on a fixed platform in that level, but is should be considered that a container to be loaded will normally stand on a truck or a semi-trailer, the carrier chassis of which will be gradually lowered as the loading proceeds. According to the invention the associated problem is solved by mounting the loader on or integrally connecting it with a lift table, e.g. supported by a scissor structure, whereby the loader can be height adjusted for gradual adaptation to the height position of the container floor. Such an adaption may be effected by automatic control based on a detected height difference between the container floor and the lift table.

Thus, the loading and piling of reasonably uniform articles for filling of the container may take place almost fully automatically, of course regardless of the shape or weight of the articles complying with official standards for manual handling of the articles.

The invention also comprises a loader apparatus for carrying out the above-described method. For the apparatus it is characteristic that it will gradually change its position relative to the container, and, since the container will normally be stationary while being loaded, the apparatus should be moved, in an absolute sense, in the horizontal direction during the filling of the container. Hereby the feeder conveyor for supplying the articles shall be adapted so as to cooperate with this non-stationary loader apparatus, and, because the feeding will normally take place in the direction of displacement of the loader, it will be preferable to make use of a length variable feeding conveyor. Under these circumstances it will be natural that it is the loader apparatus which is provided with such a length variable receiver conveyor, as the apparatus may then cooperate with stationary feeding means at the loading sites.

The invention ought to be linked up with a corresponding apparatus for orderly removing of the articles from the containers, as the subsequent unloading of the articles, when carried out manually, may be as heavy as the loading. However, the unloading can be effected in an essentially simplified manner, e.g. by a simple rearward tilting of the container, and the loading of the articles, therefore, will be the more important aspect of the invention.

BRIEF DESCRIPTION OF THE DRAWINGS

In the following the invention is described with reference to the drawings, in which.

DETAILED DESCRIPTION

Figure 1:
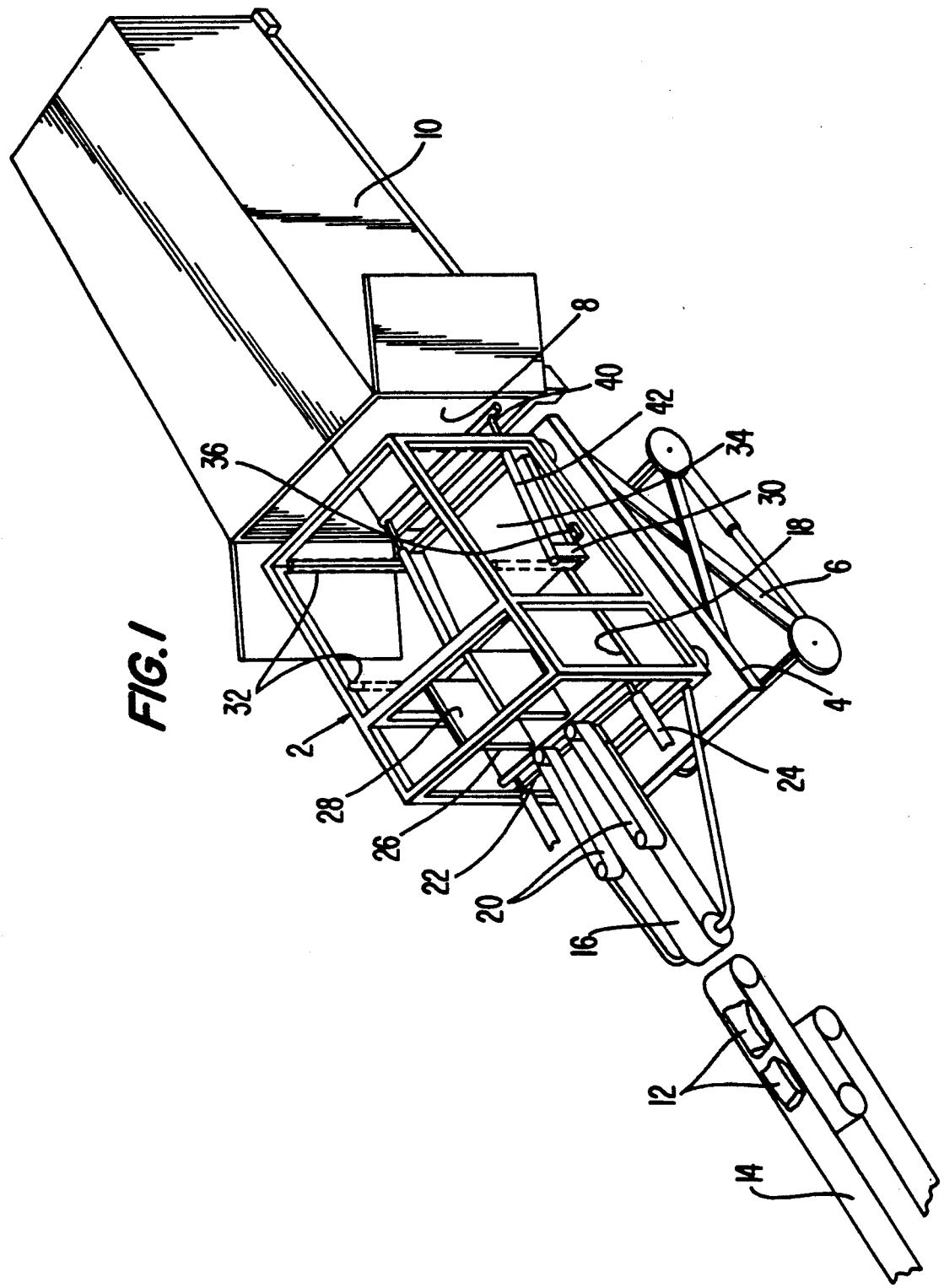
FIG. 1 is a schematic perspective view of a loading apparatus according to the invention.

The loader shown is arranged in a frame structure 2, which is mounted on a wheel supported lift table 4, i.e. a height adjustable table supported e.g. by a scissors structure 6. Hereby the table 4 is locatable in a position adjoining the floor 8 of a container 10, which, through its openable rear end, is to be loaded with lying sacks supplied with lengthwise orientation on or by a feeding conveyor 14. The delivery end of this conveyor is located just next to a receiver end of a further feeder conveyor 16, which is in fixed connection with the frame structure 2 and conveys the sacks 12 forwardly to a middle area of a broad receiver plate 18 that is rigidly fixed in the frame structure 2 in an intermediate level therein. Right above the feeder conveyor 16 is mounted a pair of converging clamping belts 20, which are operable to laterally clamp the conveyed sacks to a desired width thereof.

Figure 2:
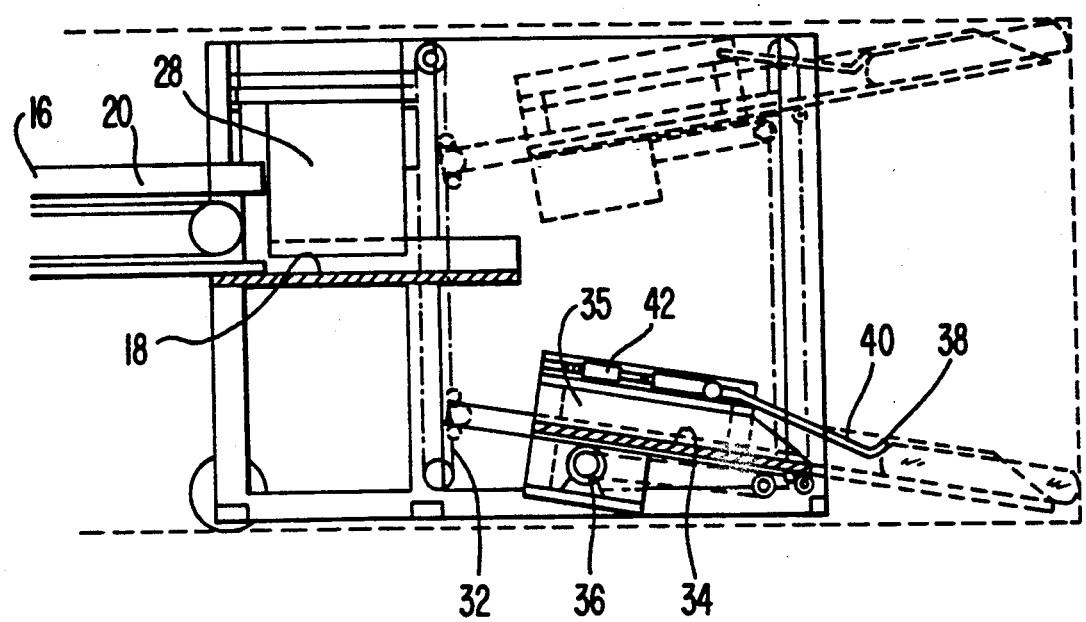
FIG. 2 is a lateral view thereof.
Figure 3:
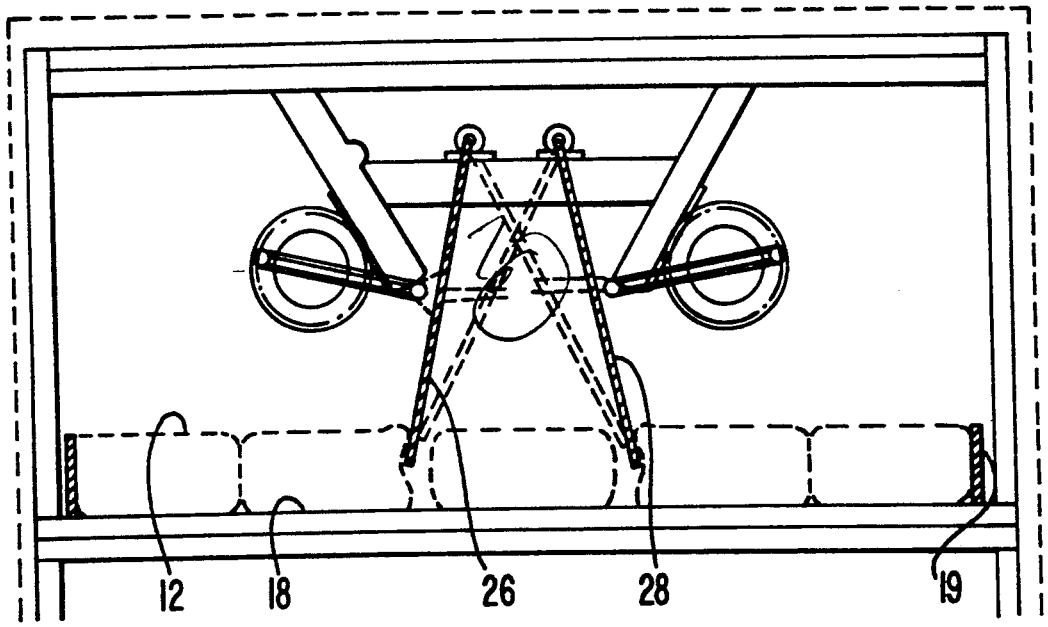
FIG. 3 is a detailed view of a part of the apparatus.

As shown in more detail in FIG. 2, the receiver plate or distributor plate 18 is located somewhat below the feeding level of the belt 16, i.e. the sacks will be delivered by falling onto the plate 18. Therefore, behind the sacks thus delivered there will be room for a transverse pushing beam 22, which, by cylinders 24, can be pushed forwardly over the plate 18. As shown in FIGS. 1 and 3, above the middle area of the plate 18 there is suspended a pair of mutually separated pivot wings 26 and 28, which are transversely pivotable about respective upper axes by a driving system (not shown). These wings are used for pushing the received sacks laterally on the receiver plate 18, the wings e.g. assuming initial positions as shown in FIG. 3 for receiving the first sack, which is caused to be pushed by the wing 26 one sack width to the left, whereafter, the wing is returned for reception and repeated lateral pushing out of the next sack, which will thereby push the first sack further outwardly. When the area to the left of the receiving area is filled by sacks both wings 26 and 28 are swung to the left just as in FIG. 3 they are shown swung to the right, and the following sacks are then correspondingly pushed to the right. When only the central receiving area is vacant the wings are positioned almost vertically such that a last sack is received direct between them, whereby the received series of sacks, e.g. a total of five sacks, has been laid out in a transverse row with a high degree of area exploitation.

In front of the receiver or distributor plate 18 the main frame 2 holds a lift structure 30, which can be raised and lowered in the frame by chains 32 and driving means (not shown). On this structure is provided a carrier plate 34, which, when positioned flush with the receiver plate 18, can receive the laid out row of sacks when the latter is pushed forwardly by means of the pushing beam 22. Thereafter the row of sacks can be lowered on the carrier plate 34 by a lowering of the lift structure 30, initially almost down to the floor level.

The carrier plate 34 is mounted on the lift structure 30 so as to be forwardly displaceable by driving means 36, whereby the row of sacks can be moved forwardly to a position outside the front end of the frame structure 2. On the lift structure 30 is provided a transverse dolly beam 38 mounted on longitudinal side arms 40 projecting from holding systems 42, which comprise means for effecting or allowing the arms to be pivoted in the vertical direction, namely, between a raised position, in which the dolly beam 38 permits the row of sacks on the carrier plate 34 to be moved forwardly along with that plate into a position, in which the rear ends of the sacks are located just outside the dolly beam 38, and a lowered position, in which the beam 38 reaches down behind these ends of the sacks, such that the sacks will be pushed off the carrier plate 34 when the latter is thereafter retracted by return actuation of the driving means 36.

The row of sacks has thereby been loaded onto the floor in front of the loader apparatus, and a new operation cycle can be initiated. However, the laying out of a new row of sacks on the receiver plate 18 can well be effected during the operation of the carrier plate after the receipt of the previous row of sacks.

It should be noted that the pivot wings 26 and 28 project downwardly to a level approximately at half the height of the sacks lying on the plate 18 and that the pushing beam 22 projects upwardly to slightly below that level, such that the beam 22 may well be actuated while the wings are hanging down. The beam, of course, should only be returned before the next sack is supplied from the conveyor 16.

Prior to the first operation, the entire loading apparatus is displaced from the lift table 4 into the container to be loaded, where it is placed in such a position that the carrier plate 34, by its forward movement, will bring the first row of sacks onto the floor immediately adjacent or against the front end wall of the container. By the next operation cycle, the task will be to load the next row of sacks at the top of the first row, but this will only be a matter of a suitable control of the movement of the lift structure 30 based either on a knowledge of the thickness of the sacks or, preferably, on an automatic detection of the top level of the first row. Likewise the entrance depth of the loader into the container may be determined automatically, e.g. by ultrasonic detection of the correct spacing from the end wall. Also, by presetting or automatic detection it can be ascertained when there is no room for further rows of sacks once the piling has been brought close to the ceiling of the container, whereafter it is possible to effect automatically that the loader is retracted one step corresponding to the length of the sacks, such that the piling up of new transverse rows of sacks can be initiated.

During the associated stepwise retraction of the loader a constant supply of sacks from the conveyor 14 should be ensured, and with the arrangement shown the particular conveyor 14 should thus be of the length variable type, as also indicated in FIG. 1. However, it may also be the conveyor 16 which is length variable, and it will be a further possibility that the sacks are loaded laterally onto the conveyor 16 from a fixed position of delivery, whereby, however, the conveyor 16 should be rather long.

Normally, the container 10 will be carried on a vehicle chassis, which will be pressed resiliently downwardly by the growing weight resulting from the loading work, but this will be insignificant as long as the loader operates entirely inside the container. It is predictable, however, that the carrier chassis has been lowered considerably at the moment where the loader, by its retraction, returns to the lift table 4, and, for facilitating a safe return, it is possible, according to the invention, to make use of means for detecting the lowering of the chassis and effecting a corresponding height adjustment of the lift table. By way of example, directly between the cooperating ends of the lift table and the container floor there may be provided a connector member, which will be tilted by an occurring height difference, and which is provided with sensor means for detecting such a tilting and thereby cause the control mechanism of the lift table to bring the table into a height position practically in level with the container floor.

For many applications a loader according to the invention will be predestinated to handle objects of reasonably well defined and uniform size, e.g. sacks with grain or fishmeal, and the particular apparatus, therefore, may thus be adapted to such a special purpose, both constructively and as far as control is concerned. If the height dimension of the laid out sacks is not very uniform it may be desirable e.g. to make the dolly beam 38 sectionally divided such that it is provided with dolly elements that are individually pivotable for optimal cooperation with the respective sacks in the loaded rows of sacks.

The loader may be arranged inside an openable container shell on the lift platform 4.

In a preferred embodiment the loader is adapted for use in ISO standard containers, and here the loader will be highly suitable for the handling of standard size sacks measuring some 49×99 cm. Five of these sacks located side by side, FIG. 3, will have, in free condition, a total width of 245 cm, but the internal width of the container is only 236 cm. It is advantageous, therefore, that pivot wings 26, 28 or other laterally movable means be provided for effecting a narrowing pushing together of the sacks, such that these may be loaded anyway. By the reception of the central, last sack in each transverse row, see FIG. 3, the wings are pivoted outwardly sufficiently to create ample space for the introduction of the last sack, and the row can be pushed off when the wings are pivoted slightly inwardly, whereby the sacks will fill out the row or layer in a compact manner. By the piling up, therefore, the available space will be effectively exploited.

It applies correspondingly that the loader may be controlled so as to produce a slight compaction of the sacks in their longitudinal direction by means of the dolly beam 38. The internal container length is 5.80 m, and when a row of six sacks measure 5.94 m in free condition it will thus be suitably possible to load the container with six sacks lengthwise, when the sacks by each loading operation are pushed slightly together. Also hereby the available space will be well exploited, and, in fact, the container may be loaded with almost the double number of sacks compared to loading by palletized sacks.

For the loading apparatus it is decisive that there are no parts projecting outside the limits set by the opening of the container or the cargo space and that there are no parts projecting forwardly beyond the wall surface, against which the articles are loaded in and piled, irrespective of that wall being a container end wall or any other sack wall.

Presumably it will be unavoidable that at its front end the loading apparatus should have upstanding frame portions 32 at opposite sides, and these parts will limit the effective loading width. For that reason these parts should be as narrow as possible in the width direction, and it is to be ensured that the sacks to be loaded are not laid up in a row of a width or rather length that is larger than the usable loading width here specified. As shown in FIG. 3, therefore, fixed side stop plates 19 should be provided at the lateral ends of the receiver plate 18, just as corresponding side plates, designated 35 in FIG. 2, should be provided on the lift carrier plate 34. After their loading-in the side compressed sacks will all by themselves be rebroadened so as to fill out the entire width of the container, and hereby it will even be achievable that the sacks may bulge out locally into the corrugations that are often provided in the interior sides of the containers.

Also the upper cross frame portion at the front end of the loader should be narrow, such that it will not imply any significant limitation of the possible piling height. However, the loading in of the uppermost sacks may be effected with the entire lift structure assuming a slightly forwardly and upwardly inclined position as shown in dotted lines in FIG. 2, whereby it is possible to pile the sacks up to a rather high level anyhow, e.g. up to some 10–15 cm below the ceiling of the container. It will be understood that during its raising the lift structure may gradually change its inclination between the two illustrated positions.

I claim:

1. A loading apparatus for consecutively loading received articles into open ended cargo containers, each said cargo container having a longitudinal axis, the loading apparatus comprising a receiver plate arranged transversely to said longitudinal axis of said cargo container, means for laterally displacing articles received on the receiver plate so as to build a transverse row of articles on the receiver plate, means for consecutively transferring said transverse row of articles from the receiver plate to respective unloading positions for successively building up a longitudinal row of transverse rows of piles of articles, the unloading being effected by retraction of article carrier plate means against an action of abutment means engaging respective rear ends of the articles so as to non-retractably hold the articles, a frame structure adapted to be rollingly supported on a support surface of the container, said frame structure having said receiver plate and an associated article displacing means arranged in a stationary position in a rearmost portion thereof, and a vertically movable lift plate arranged at a foremost portion thereof, said lift plate being vertically displaceable between a receiver position flush with the receiver plate such that the lift plate can receive an entire transverse row of articles from the receiver plate by actuation of a transferring means, and a plurality of unloading positions in respective different height positions, said lift plate further being forwardly displaceable from said frame structure in each of said plurality of unloading positions, and wherein vertically movable abutment means are provided so as to operatively engage the rear ends of the articles resting on the lift plate in the forwardly displaced position of the lift plate to thereby effect an unloading of the row of articles in response to a retraction of the lift plate.

2. A loading apparatus according to claim 1, wherein the lift plate is mounted in a lift structure movable up and down in the frame structure, and wherein the abutment means are movably mounted on the lift structure so as to be displaceable between an inoperative position allowing for a passage of the articles when the lift plate is displaced forwardly and an operative position behind the rear end of the respective articles prepatory to the retraction of the lift plate.

3. A loading apparatus according to claim 1, wherein the receiver plate includes upstanding side wall portions for limiting a width of a transverse row of articles thereon to a width less than an internal width of the frame structure.

4. A loading apparatus according to claim 1, wherein an inlet conveyor to the receiver plate comprises opposed edgeways arranged conveyor belts converging in a forward direction for calibrating a width of the articles.

5. A loading apparatus according to claim 1, wherein the cargo spaces include standard containers, the frame structure is dimensioned for substantially filling out both a width and a height of the standard containers, and wherein the apparatus is introducible into said standard containers from an associated exterior carrier structure.

6. A loading apparatus according to claim 5, wherein the exterior carrier structure includes a lift platform, and wherein control means are provided for ensuring a location of the platform in a height position corresponding to a height of a floor of the containers when the loading apparatus is respectively moved into and out of the containers.

7. A loading apparatus according to claim 5, wherein the lift plate is controlled in such a manner that, in a low position, the lift plate is slightly forwardly and downwardly inclined, while in a fully raised position, the lift plate is forwardly and upwardly inclined.

* * * * *